United States Patent [19]

Piatt et al.

[11] Patent Number: 4,761,665

[45] Date of Patent: Aug. 2, 1988

[54] HIGH SPEED PRINT/CARTRIDGE PRINTER/FEEDER

[75] Inventors: Michael J. Piatt, Enon; Kevin L. Houser, Kettering, both of Ohio

[73] Assignee: Eastman Kodak Company, Rochester, N.Y.

[21] Appl. No.: 20,302

[22] Filed: Mar. 2, 1987

[51] Int. Cl.[4] ........................ G01D 15/16; G01D 15/28

[52] U.S. Cl. ................................ 346/140 R; 346/134; 400/126; 400/624; 400/662

[58] Field of Search ................ 346/140, 134; 400/126, 400/624, 625, 629, 641, 659, 662

[56] References Cited

U.S. PATENT DOCUMENTS

| | | | |
|---|---|---|---|
| 3,789,969 | 2/1974 | Howard et al. | 400/124 |
| 4,223,323 | 9/1980 | Bader et al. | 346/140 R |
| 4,533,927 | 8/1985 | Iwagami | 346/140 |
| 4,567,494 | 1/1986 | Taylor | 346/140 |
| 4,686,540 | 8/1987 | Leslie | 346/140 X |
| 4,698,650 | 10/1987 | Watanabe | 346/134 |

*Primary Examiner*—Joseph W. Hartary
*Attorney, Agent, or Firm*—John D. Husser

[57] ABSTRACT

A high-speed ink jet printing apparatus adapted for use with a plurality of insertable print/cartridges and having a platen for transporting successive line portions of a print medium through a linear print zone, includes a carriage with a plurality of nests for supporting, positioning and electrically coupling respective print/cartridges in the printer, the nests being spaced along the transverse dimension of the linear print zone in a manner dividing it into a plurality of discrete transverse subportions of equal length. A traversing device reciprocates the carriage in forward and return directions parallel to the linear print zone. The movement of the traverse is approximately equal to the length of the print zone divided by the number of nest means of the carriage. The printer can include a sheet supply station, and a platen constructed to feed successive sheets from the supply station into a print path leading to the print zone and the carriage can include guides for directing fed sheets along the print path. The printer also includes a plurality of drop catchers located proximate the print zone at transversely spaced locations, and movable with respect to supported print/cartridges.

5 Claims, 7 Drawing Sheets

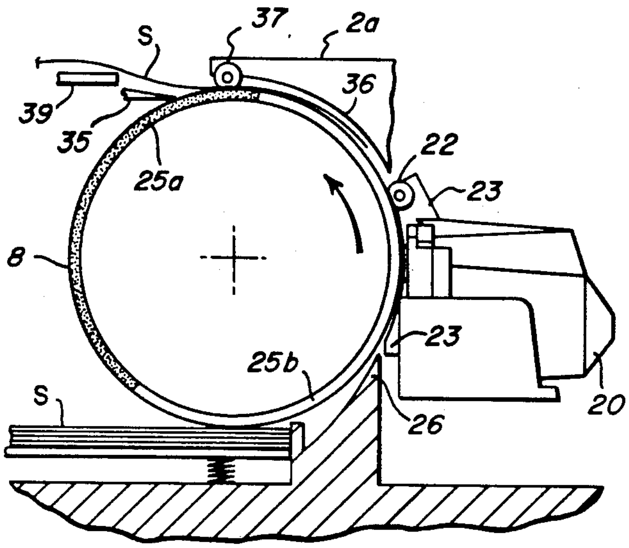
FIG. 4C
FIG. 5C
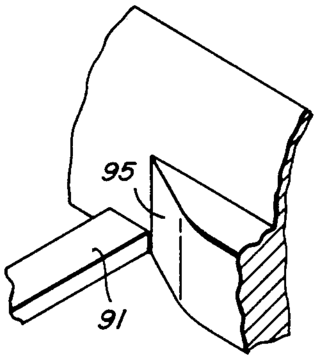
FIG. 6C
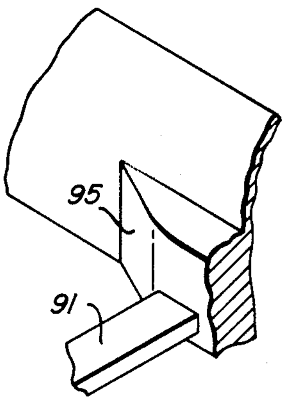

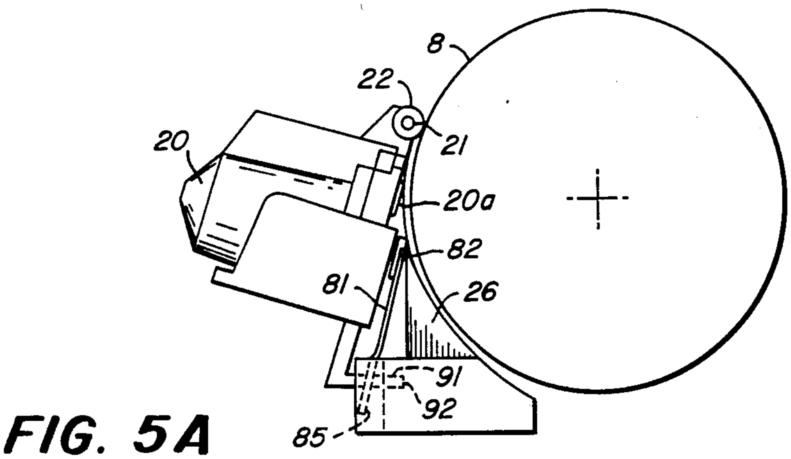
FIG. 5A
FIG. 5B
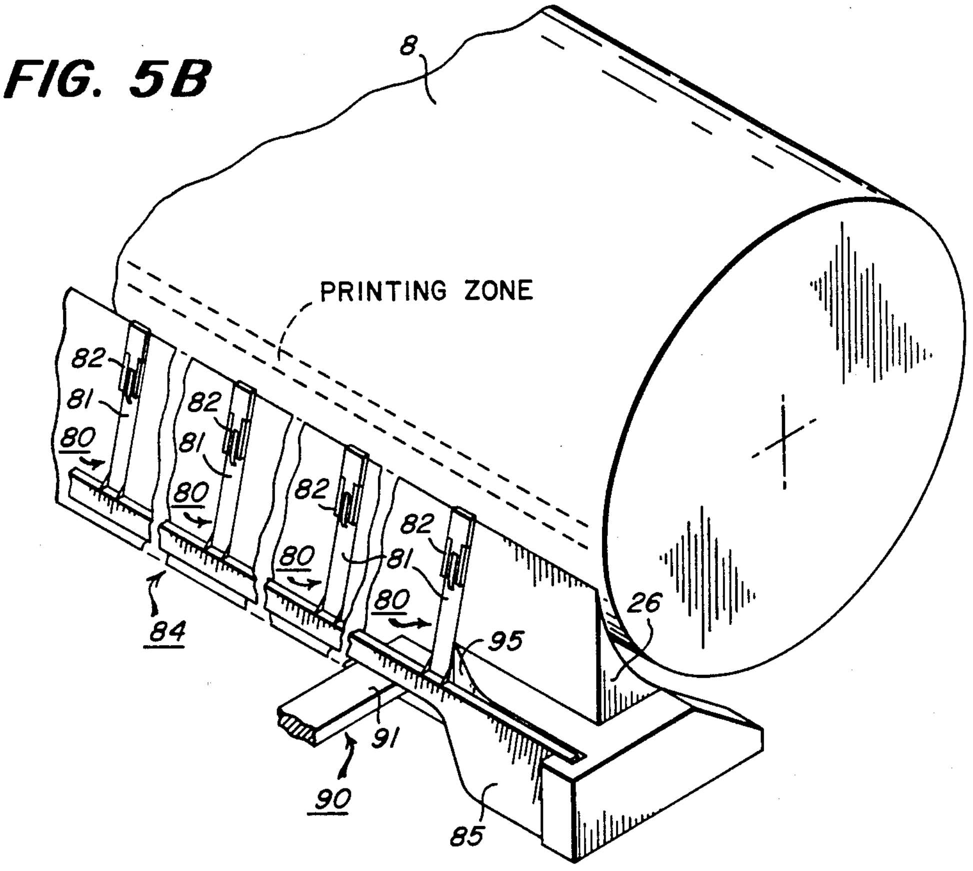

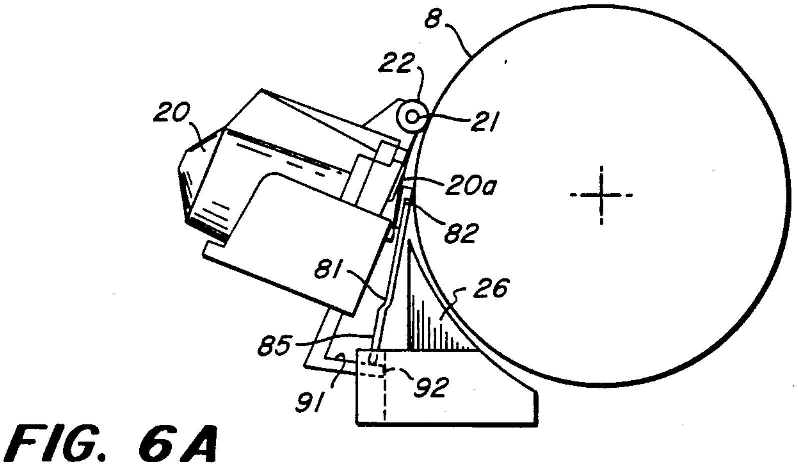
FIG. 6A
FIG. 6B
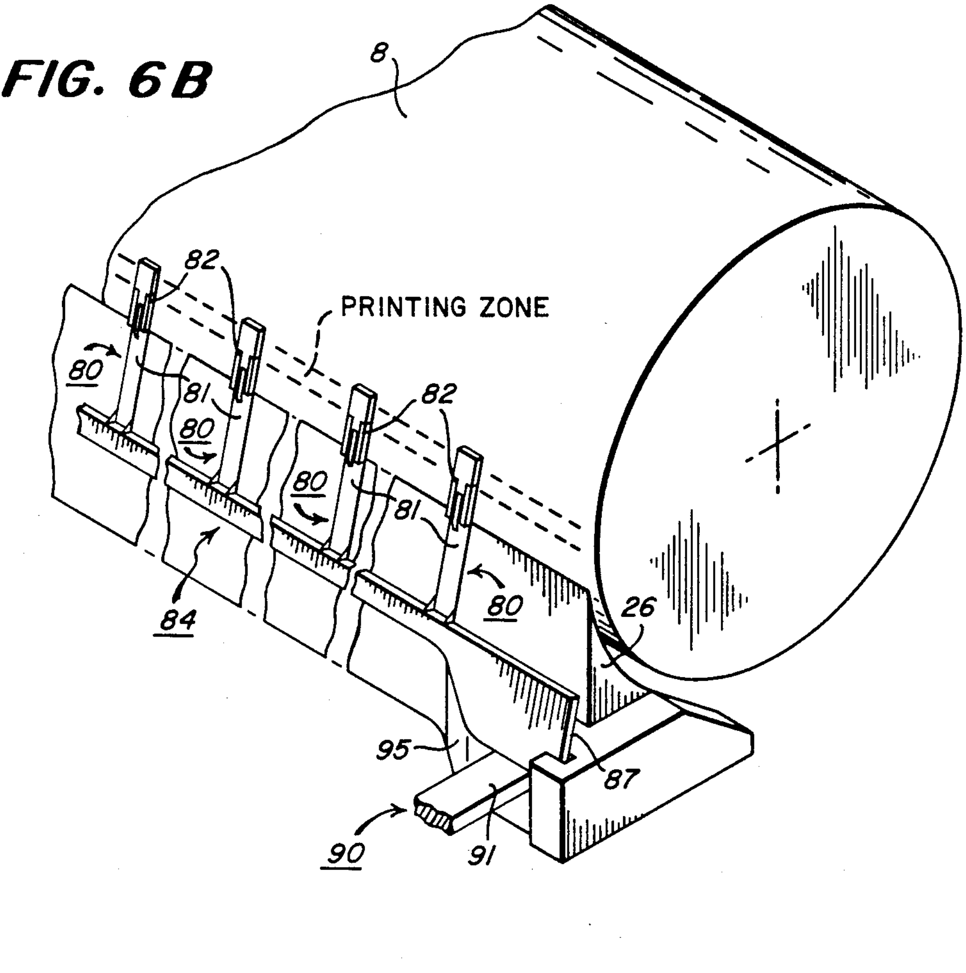

HIGH SPEED PRINT/CARTRIDGE PRINTER/FEEDER

BACKGROUND OF THE INVENTION

1. Field of the Invention

The present invention relates to serial line printers of the type using insertable drop-on-demand ink jet print-/cartridges and more particularly to constructions for such printers that enable high speed throughput with automatic feeding of successive print sheets.

2. Background Art

U.S. Pat. No. 4,709,245 describes highly useful printer configurations wherein a plurality of insertable print/cartridges, e.g. of the thermal drop-on-demand type, are accurately positioned, optically detected and synchronized in drop ejection to produce proper inter-placements of drops in the common printing of a line. Thus a common carriage traverses each of its supported print/cartridges across the entire print. This printer approach is highly desirable for producing outputs comprising different ink types, for enhanced resolution (see U.S. Pat. No. 4,709,247 and for some enhancements in regard to output speed.

U.S. application Ser. No. 20,416, entitled "Compact Printer Having An Integral Cut-Sheet Feeder" by Piatt and filed concurrently herewith discloses a unique configuration for providing a line printer with a sheet feeding capability in a compact, integral unit. This is accomplished, in part, by utilizing the print platen both to feed successive sheets from an integral supply station and to transport the fed sheets through the print zone and out of the printer unit. One preferred embodiment of the printer/feeder unit divides the transport drive for sheets between an upstream transmission zone at the sheet supply station and a downstream transmission zone, where a pressure roller presses passing sheet portions against the rotating print platen. This approach utilizes guide structure for directing the leading edge of a fed print sheet to the pressure roller nip.

SUMMARY OF INVENTION

One important purpose of the present invention is to provide a printer configuration for effecting high speed printing with a plurality of insertable print/cartridges. Another significant and related purpose of the present invention is to provide printer constructions which employ a print carriage, constructed for high speed printing, to effect sheet guiding for an integral printer/-feeder unit. Yet another important and related purpose is to utilize portions of such printer/feeder downstream drive to support accurate carriage traverse along the print zone. Another objective of the present invention is to provide droplet catchers which are selectively movable to operative relations between supported print/cartridges and the print zone.

In one aspect the present invention constitutes in an ink jet printing apparatus adapted for use with a plurality of insertable print/cartridges and having platen means for transporting successive line portions of a print medium through a linear print zone, a system for cooperative high speed printing with a plurality of such print/cartridges comprising: (a) a carriage including a plurality of nest means for supporting, positioning and electrically coupling respective print/cartridges in the printer, the nests being spaced along the transverse dimension of the linear print zone in a manner dividing it into a plurality of discrete transverse subportions of equal length and (b) traversing means for reciprocating the carriage in forward and return directions parallel to the linear print zone, the movement of the traversing means being approximately equal to the length of the print zone divided by the number of nest means of the carriage. In a preferred embodiment the printer includes means forming a sheet supply station, the platen means is constructed to feed successive sheets from the supply station into a print path leading to the print zone and the carriage means includes means for guiding fed sheets along the print path.

In another aspect the present invention provides (i) a plurality of drop catcher means located proximate the print zone at transversely spaced locations, such catcher means being movable from retracted positions out of the droplet path of supported print/cartridges to catching positions for intercepting droplets from supported print/cartridges and (ii) means for selectively moving such catcher means between the retracted and catching positions.

BRIEF DESCRIPTION OF THE DRAWINGS

The subsequent description of preferred embodiments refers to the attached drawings wherein:

FIGS. 5-A, 5-B and 5-C are respectively a cross-sectional schematic and perspective views (FIG. 5-B being compressed in the axial direction in the same manner as FIG. 3) and showing portions of a drop-catcher actuating mechanism of the present invention in the inoperative disposition; and FIGS. 6-A, 6-B and 6-C provide the same views as FIGS. 5-A to 5-C but with the mechanism in its catching disposition.

DETAILED DESCRIPTION OF PREFERRED EMBODIMENTS

Figure 1:
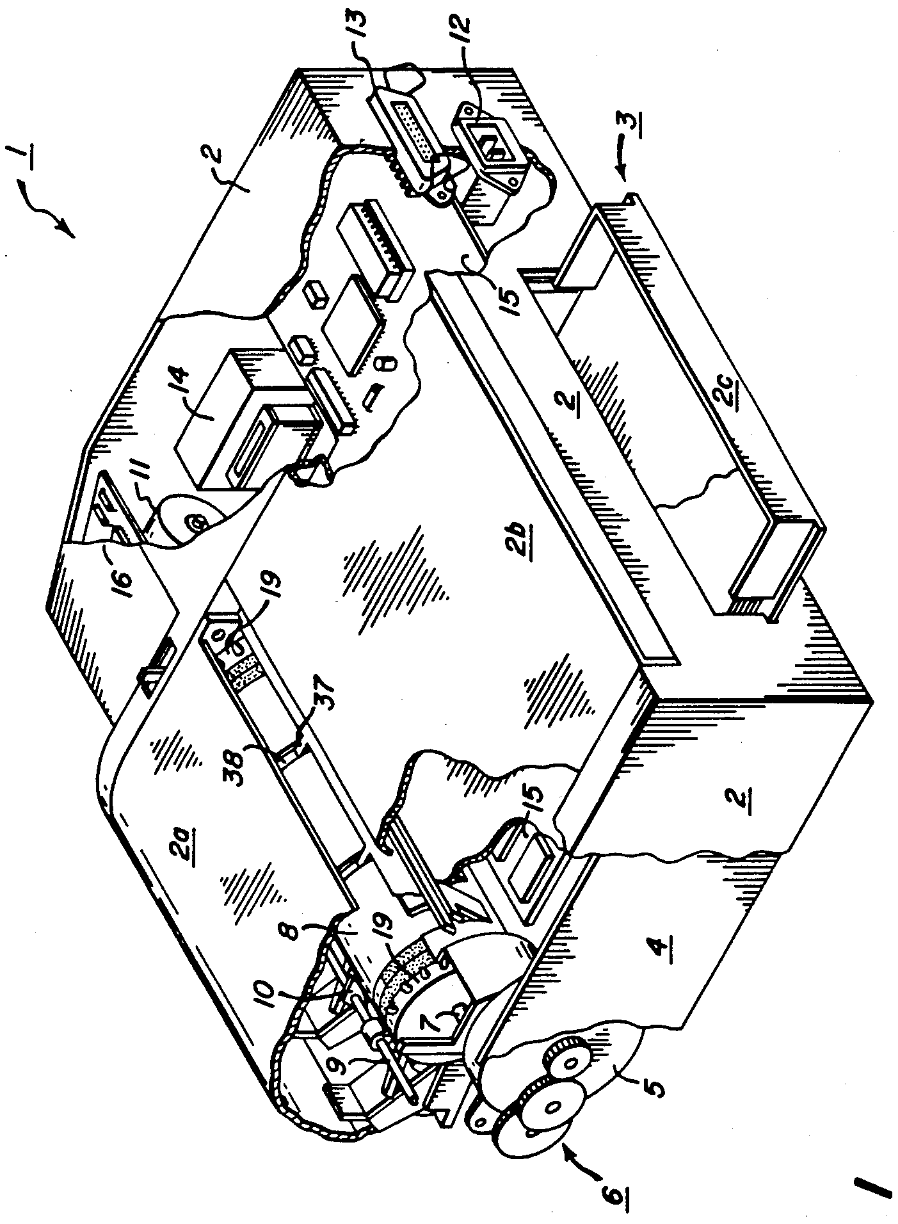
FIGS. 1 and 2 are rear perspective views, with portions of the housing broken away and/or removed, of one printer embodiment in accord with the present invention.

The printer 1 shown in FIG. 1 is an embodiment of the present invention employing ink jet printing with insertable, drop-on-demand print/cartridges. While this printing technology is particularly useful for effecting the objects of the present invention, one skilled in the art will appreciate that many of the subsequently described inventive aspects will be useful in compact printers employing other printing approaches. The printer 1 has a housing 2, which encloses the operative printer mechanisms and electronics, and includes a pivotal front lid *2a*, a pivotal rear lid *2b* and a rear wall *2c* of cassette drawer 3. Within the housing 2 is a main frame assembly (one wall 4 shown in FIG. 1) on which various components of the printer are mounted. Thus, a platen drive motor 5 is mounted to impart rotary drive through gear train 6 to a drive shaft 7 for a cylindrical platen 8 constructed in accord with one preferred embodiment of the invention, subsequently explained in more detail. Also mounted on the main frame assembly is a bail assembly 9 which is constructed to cooperate with platen 8 in accord with the present invention, as well as to support a print/cartridge carriage 10, which is shown in more detail in FIG. 3. Also shown in FIG. 1 are the printer's carriage drive motor 11, power and data input terminals 12, 13, power transformer means 14 and logic and control circuitry, which is disposed on one or more circuit boards 15. A control panel 16 for operator interface is disposed on the top front of the print housing.

Figure 3:
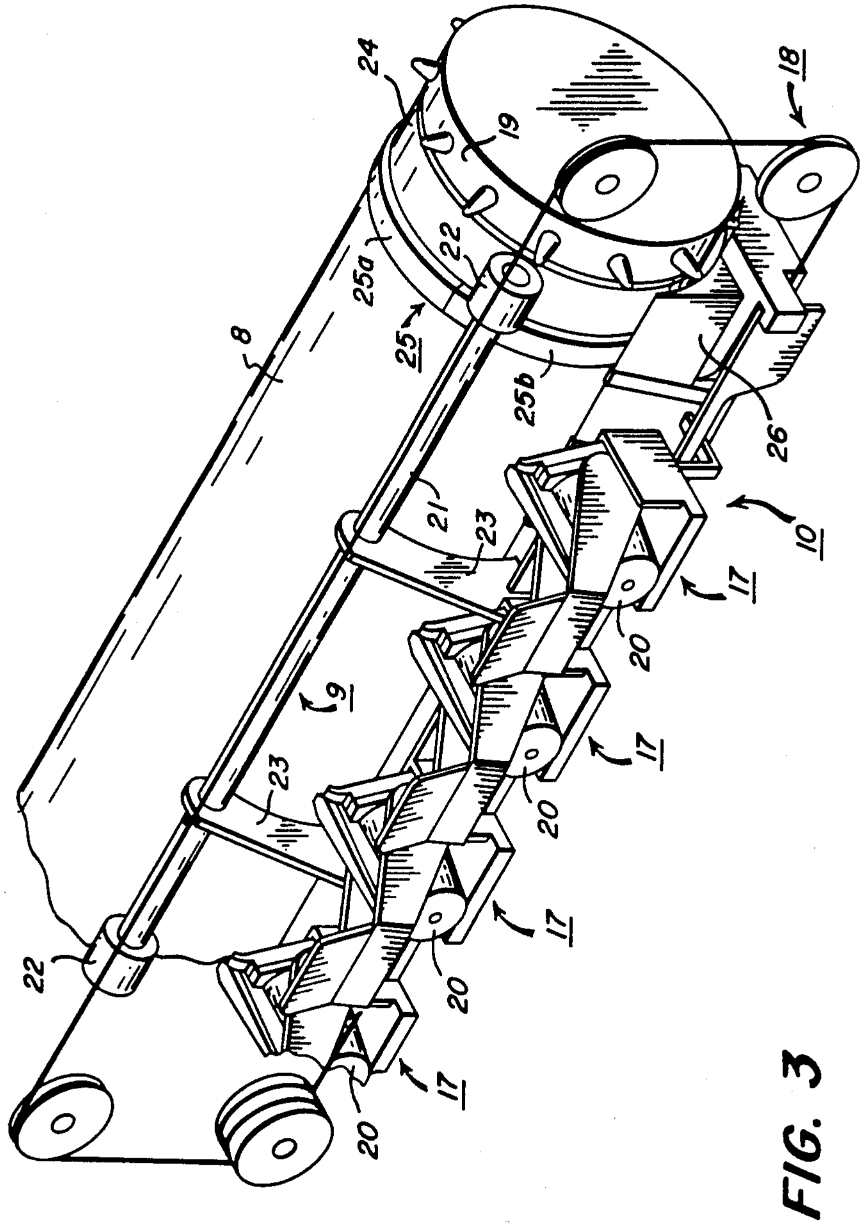
FIG. 3 is a front perspective view of the print platen, drop catcher and print head carriage assemblies of the FIG. 1 printer, the view being compressed in the axial dimension of the platen and having other portions exaggerated in scale for illustrative purposes.

Referring to FIG. 3, the print/cartridge carriage 10 can be seen to comprise four nests 17 coupled for movement as a unit to translate across respectively line segments of a print zone. Each of nests 17 is adapted to insertably receive, position and electrically couple a print/cartridge 20 in an operative condition within the printer. Such print/cartridge can be thermal drop-on-demand units that comprise an ink supply, a driver plate and an orifice array from which ink drops are selectively ejected toward the print zone in accord with data signals, e.g. transmitted through the printer logic from a data terminal such as a word processor unit. Both the print/cartridge construction and the positioning and coupling structures of nests 17 are described in more detail in U.S. application Ser. No. 945,134, filed Dec. 22, 1986, and entitled "Multiple Print/Cartridge Ink Jet Printer Having Accurate Vertical Interpositioning", by Piatt et al, which is incorporated herein by reference. However, other serial printing structures can be usefully employed in combination with the present invention. FIG. 3 also illustrates a carriage drive assembly 18, comprising a cable and pulley loop coupled to the motor 11 and to the carriage 10. Tractor-feed wheels 19 mounted on the ends of platen 8 are used to advance tractor-feed medium when printer 1 operates in that alternative printing mode.

Considering now the sheet feed constructions in accord with the present invention, the perspective illustration in FIG. 3 shows cooperative platen and carriage structures with non-scale sizes for more clear visualization of significant features. Specifically, platen and carriage assembly features have been somewhat axially compressed and the platen end features enlarged to show one preferred embodiment that enables platen rotation to effect the feeding of sheets from a supply stack, as well as transport of a fed sheet along the print path, from an ingress through the print zone and through a printer egress. Thus, the bail assembly 9 includes a shaft 21 which rotatably supports bail pressure rollers 22 near each end of the platen and which slidingly supports guide arms 23. As shown, the guide arms curve around the front platen periphery down into the zone of their attachment with other portions of carriage assembly 10. Axially inwardly from the tractor-feed wheels at each end of the platen, there are constructed frictional transport bands 24, e.g. formed of a rubberized coating. Each of bands 24 extends around the entire platen periphery and is of substantially the same diameter as the platen 8. The frictional transport bands are respectively aligned with pressure rollers 22 so as to pinch paper therebetween in a manner that causes transmission of the platen rotation to a print sheet which has passed into their nip. Axially inwardly from each of transport bands 24 the platen comprises raised feed ring portion 25 that extend around the platen periphery. The feed ring portions extend above the platen surface, e.g. about 0.015", and each is divided into a rough surface sector 25*a* and a smooth surface sector 25*b*. The rough sectors of the two feed rings are at corresponding peripheral locations, as are their smooth sectors.

Also shown in FIG. 3 is a lower sheet guide member 26 which extends along the lower periphery of platen 8 from an ingress of the sheet feed path to a location contiguous the lower extensions of guide arms 23. Thus, portions 26 and 23 define means for guiding a fed sheet in close proximity to the platen 8, from the print path ingress into the nip of pressure roller 23.

Figure 4A:
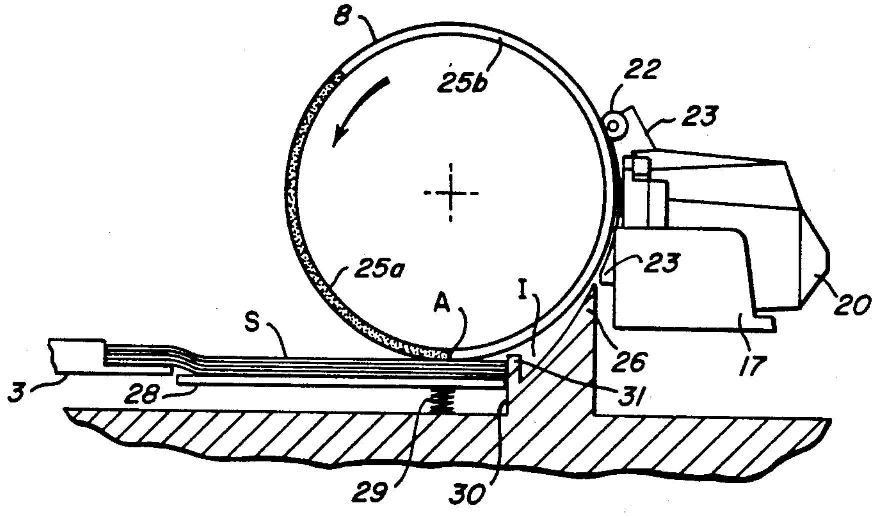
FIGS. 4-A, 4-B and 4-C are side schematic views of assemblies shown in FIG. 3.
Figure 4B:
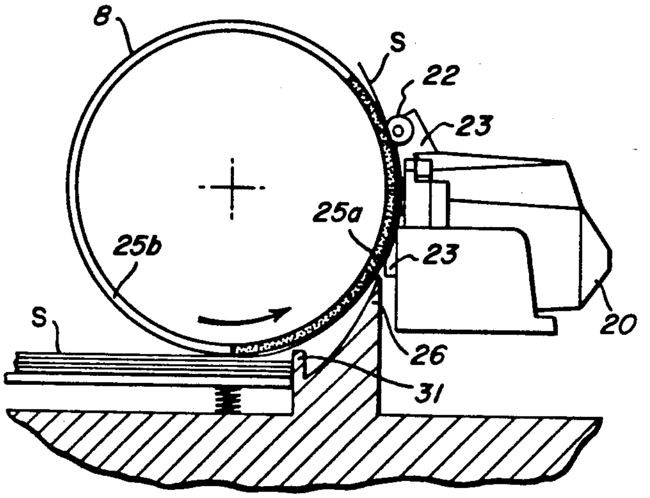

Referring back to FIG. 1, it can be seen that the cassette drawer 3 is slidably mounted in the bottom of the printer for movement between a withdrawn location (for the insertion of a stack of print sheets) and a stack positioning location. As shown in FIG. 4-A, the front end of the stack S positioned by cassette 3 rests on a force plate 28 which is pivotally mounted at its rear end for up-down movement and is biased upwardly by spring means 29. The leading stack edge is indexed against sheet index plate 30 and buckler members 31 as shown in FIG. 4-A. The functions of the structural elements described above will be further understood by considering the sheet feeding and printing sequences of the printer 1 with reference to FIGS. 4-A to 4-C. At the stage shown in FIG. 4-A, the platen 8 has been initialized to a start position. (This condition can be readily achieved by various means, e.g. depression of force plate 28, via its tab 28*a*, while indexing the platen to the FIG. 4-A orientation by detection of a mark on the platen end by a photodetector not shown.) In this condition the leading edges of the rough surface sectors 25*a* of feed rings 25 are located at the contact point A with the top face sheet of a stack positioned by cassette 3. It is preferred that the contact zone A be located slightly rearwardly from the front edges of the stack, as shown in FIG. 4-A, to facilitate buckling separation of the top sheet when sheet feed commences.

As the platen 8 rotates counterclockwise betwen the FIG. 4-A and FIG. 4-B conditions, the rough surface portions 25*a* force the top stack sheet into contact with, and over, buckler elements 31, into the print path ingress I. The sequential engagements at contact zone A between successive rough surface portions 25*a* and successive portions of the upwardly biased top sheet S drive the leading sheet edge along the print path defined by the guide means 26, 23 so that the leading edge of the sheet will move into the nip between pressure rollers 22 and transport bands 24. After the leading sheet edge has passed into the nip, the feed by rough surface portions 25*a* is no longer required and, as illustrated in FIG. 4-B, the smooth portions 25*b* can now exist at the contact zone. Feed of the print sheet continues to be provided by the rotation of the platen, now by virtue of the drive transmission at the nip of roller 22, as successive lines of information are printed by traversing print/cartridges 20.

In the system illustrated in FIGS. 4-A to 4-C, the drum makes two revolutions per sheet and, as shown in FIG. 4-C, toward the end of the second revolution, the trailing edge of a printed sheet S is egressing the nip of roller 22 and smooth portions 25*b* are still passing through the contact zone. Thus, the next successive top sheet is not yet fed from the stack. When the rotation of platen 8 progresses back to the stage shown in FIG. 4-A (completing its second revolution), the trailing end of the fed sheet has passed pressure roller 22 and the next sheet feeding the transport sequence is initiated.

As shown in FIG. 4-C, it is desirable for the housing top to embody guide structure 36 and additional pressure rollers 37, aligned with bands 24 so that a printed sheet is moved completely onto the output tray 39, revealed by opening lid 2*b*. This structure is pivotal away from the drum with front lid 2*a* to allow removal of a printed sheet if a job ceases at the FIG. 4-C stage. As shown in FIG. 1 and FIG. 4-C, stripper fingers 37 are disposed within recesses 38 of platen 8 to assist in directing a sheet into the output tray when a series of sheets are printed successively. It can be seen that the described construction provides a compact and mechanically simple system for feeding and transporting sheets for the printer.

Figure 2:
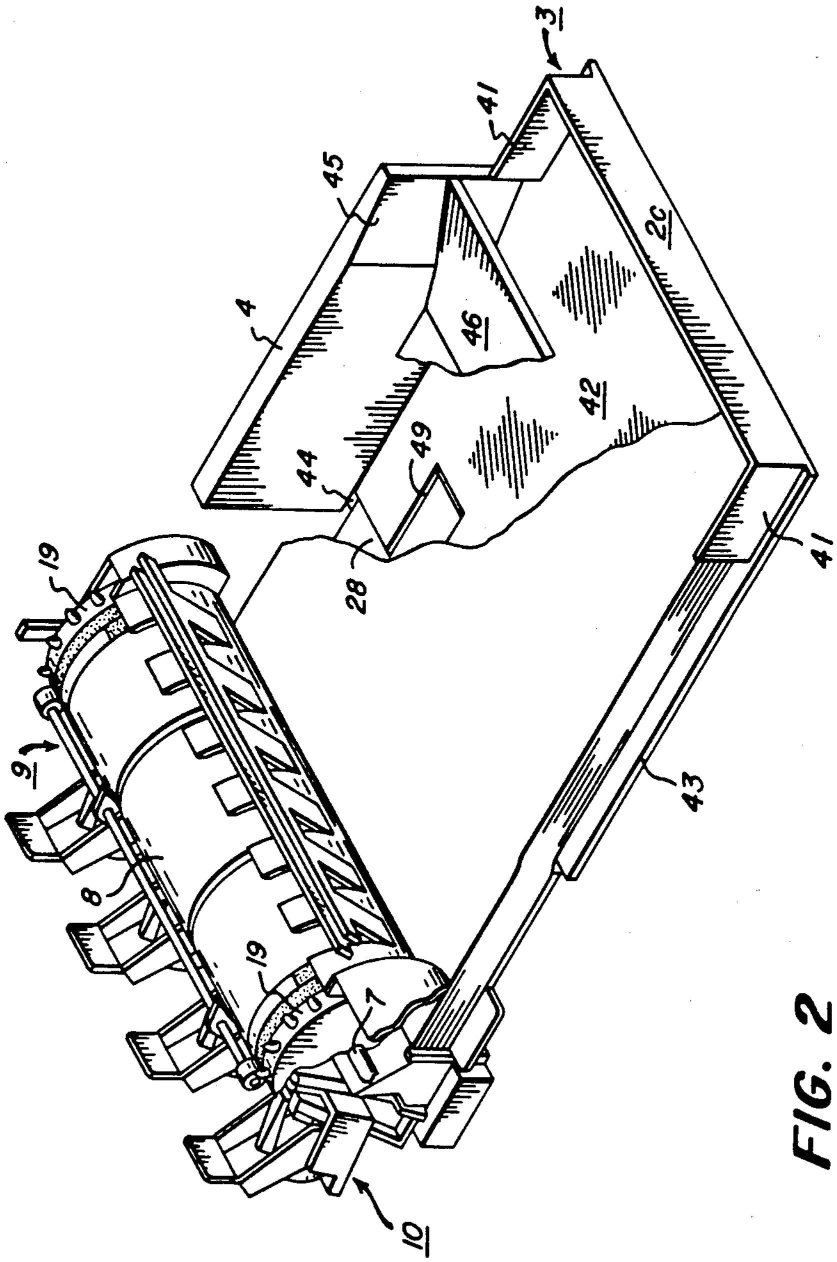

Referring now to FIGS. 2 and 3, the features of the present invention can be described with reference to the embodiment there-illustrated. As shown, the nests 17 are located on carriage 10 at predetermined transverse spacings. More particularly, the nests 17 have a center-to-center spacing that is equal to the traversing distance of the carriage 10 and carriage has a number of nests that are sufficient to cooperatively print a complete print line of print media fed thereby. For example, in the illustrated example, the print media can have approximately an 8½ inch width and the four print heads centered in transversely spaced nests 17 can each traverse a two-inch wide printing zone to cooperatively cover an 8" print zone of that media. Thus the carriage 10 need only traverse a distance of 2 inches to complete a print line (for higher resolution the carriage can operate on a forward and retrace step of 2 inches). The increase in printing speed afforded by this arrangement is clear. FIG. 2 shows the spacing of the nests 17 and supported print/cartridge 20 is proper transverse scale, while FIG. 3 has been compressed transversely for ease of illustration. Each of the nests 17 contains structure for receiving and accurately vertically interrelating the orifice arrays of print/cartridges 20, which structure is described in detail in U.S. application Ser. No. 945,134, filed Dec. 22, 1986, which is incorporated herein by reference for that teaching. One skilled in the art will appreciate that in the example embodiment just described (i.e. four print/cartridges), the line data for each successive print line can be divided appropriately, loaded into four line segment buffers and then gated in parallel from the four buffers to respective print/cartridges in synchronism with their traverse across respective print zone segments. Thus, the foregoing aspects of the present invention provide high speed printing capabilities, e.g. with traversing print/cartridges of the replaceable type.

In another aspect, the present invention utilizes the spacial disposition across the print zone, of such printing structures, to cooperate advantageously with the sheet feed constructions such as described at the beginning of this specification. Thus the existence of the print nests 17 across the print zone can be utilized to incorporate guide structure, e.g. such as guide arms 23, that curve around the drum periphery from ingress guide 27 to the nip of bail roller 22. From another viewpoint, the existence of bail roller support shaft 21 across the platen roller 8, can be utilized with significant advantage to support and accurately position the print nests with a predetermined spacing from the print media.

Whereas the disposition of the print nests at spaced locations across the print zone is advantageous from the above-mentioned viewpoints, it presents problems from the viewpoint of accessing print/cartridge orifice plates for purging. That is, it is not desirable for the operator to have to remove a print/cartridge for purging, however, the apparent alternatives are to purge onto the print zone area or have an extremely wide printer that allows lateral shift of the carriage completely to the side of the print zone. These disadvantages are overcome by another aspect of the present invention, which is best shown in FIGS. 5-A to 5-C and 6-A to 6-C.

Thus, beneath the right edge of each print zone segment, there is provided a drop catching assembly 80, that is selectively positionable between a nest-supported print/cartridge 20 and the print zone. As shown, each catcher assembly 80 comprises a vertical arm 81 that is slidably mounted in a recess formed in the front of ingress guide 26. The entire catcher assembly can be mounted by support arms (not shown) to pivot around the axis of platen 8. The tops of arms 81 have edge structures 82 for removably receiving ink blotter pads and the lower portions of arms 81 are coupled to an actuating rod 84 that extends transversely across the bottom of the print media path and has a cam portion 85 at the right side (and center, not shown) of the print path. The ends 87 of the actuator shaft 84 are mounted in grooves formed in the side portions of the ingress guide block so that the actuator shaft 84 and its coupled arms 81 can move between the FIG. 5-B and 6-B positions.

As best shown in FIGS. 3, 5-A and 6-A, the carriage 20 includes an "L"-shaped leg 90 extending from the lower right end thereof. The bottom of leg 90 comprises a cam actuating top surface 91 and a cam following end surface 92. These surfaces are constructed to operate when the carriage 10 is moved slightly beyond the right edge of its normal traverse path (i.e. moving each nest 17 slightly beyond the right edge of its print zone segment). During the last portion of this rightward carriage movement end surface 92 engages cam surface 95 formed on guide block 26 and is moved away from the print path, from the position shown in FIG. 5-C to the position shown in FIG. 6-C. As shown in FIGS. 5-A and 6-A, this movement pivots the print carriage clockwise about shaft 21 and affords space between the orifice plate 20*a* of a supported print/cartridges 20 and the platen 8. During this same rightward movement of the carriage, the top surface 91 engages cam surface 85 and moves the actuator arm 84 to its upward (FIGS. 6) position so that the blotter pads on arms 81 are moved into the space provided by the pivoting of the carriage and in front of the orifices of plates 20*a*. At this stage a purge sequence can be initiated by the control logic of the printer to fire ink into the blotter pads. Thus it can be seen that purge is implemented without introducing ink onto the print medium of the platen 8 and without the disadvantage of removing the print/cartridges or shifting the carriage extensively beyond its normal traverse.

While the disclosed embodiments of the present invention describe simplified constructions and methods for control of the platen indexing and feed sequencing, more complete control systems useful with the present invention are described in concurrently filed U.S. application Ser. No. 20,425, entitled "Printer/Feeder Having Integral Control System" by Piatt et al, which is incorporated herein by reference.

The invention has been described in detail with particular reference to preferred embodiments thereof, but it will be understood that variations and modifications can be effected within the spirit and scope of the invention.

We claim:

1. In an ink jet printing apparatus adapted for use with a plurality of insertable print/cartridges and having platen means for transporting successive line portions of a print medium through a linear print zone, a system for cooperative high speed printing with a plurality of such print/cartridges comprising:

(a) a carriage including a plurality of nest means for supporting, positioning and electrically coupling respective print/cartridges in said printer, said nests being spaced along the transverse dimension of said linear print zone in a manner dividing it into a plurality of discrete traverse subportions of equal length;

(b) traversing means for reciprocating said carriage in forward and return directions parallel to said linear print zone, the movement of said traversing means being approximately equal to the length of said print zone divided by the number of said nest means of said carriage; and (c) means forming a sheet supply station, said platen means being constructed to feed successive sheets from said supply station into a print path leading to said print zone, and said carriage means including means for guiding fed sheets along said print path.

2. The invention defined in claim 1 further including pressure roller means, shaft means extending across said print path in a direction parallel to said print zone and supporting said pressure roller means to contact said platen means at a location downstream of said print zone, said carriage being mounted for sliding traverse on said shaft means.

3. The invention defined in claim 1 further comprising a plurality of drop catcher means located proximate said print zone at transversely spaced locations, said catcher means being movable from retracted positions out of the droplet path of supported print/cartridges to catching positions for intercepting droplets from supported print/cartridges and means for selectively moving said catcher means between said retracted and catching positions.

4. The invention defined in claim 3 wherein said moving means comprise: (i) cam follower surfaces formed on each of said catcher means and (ii) cam surfaces formed on a portion of said carriage.

5. In an ink jet printing apparatus adapted for use with a plurality of insertable print/cartridges and having platen means for transporting successive line portions of a print medium through a linear print zone, a system for cooperative high speed printing with a plurality of such print/cartridges comprising:

(a) a carriage including a plurality of nest means for supporting, positioning and electrically coupling respective print/cartridges in said printer, said nests being spaced along the transverse dimension of said linear print zone in a manner dividing it into a plurality of discrete traverse subportions of equal length;

(b) traversing means for reciprocating said carriage in forward and return directions parallel to said linear print zone, the movement of said traversing means being approximately equal to the length of said print zone divided by the number of said nest means of said carriage;

(c) a plurality of drop blotter means, corresponding in number to said plurality of nest means, and being spaced equidistantly along the length of said print zone, said blotter means being mounted for movement from retracted positions below said print zone to positions for intercepting droplets directed toward said print zone from supported print/cartridges; and (d) means for selectively moving said catcher means between said retracted and catching positions.

* * * * *